US012752312B2

(12) United States Patent
Si et al.

(10) Patent No.: US 12,752,312 B2
(45) Date of Patent: Oct. 6, 2026

(54) OPTICAL TABLE CLEANING DEVICES AND METHODS OF CLEANING OPTICAL TABLES

(71) Applicant: KLA Corporation, Milpitas, CA (US)

(72) Inventors: HongBo Si, Ann Arbor, MI (US); Tara Chan, Ann Arbor, MI (US); Christopher Tourek, Ann Arbor, MI (US); John Szilagyi, Dexter, MI (US); Jaejung Kim, Seoul (KR); Alberto Daniel Aguilar, Newburgh, IN (US); Sergio Alejandro Perez, Powder Springs, GA (US); Qiyue Ma, Atlanta, GA (US); Yohanes Tezera, Clarkston, GA (US); Marco Antonio Marquez, Cartersville, GA (US); Jennifer Carol Wolfe, Flat Rock, NC (US); Luke Dague, Hyndman, PA (US); Denzel Carter, Naples, FL (US); Adriano Alessandro Bayz, Washington, DC (US); Claire Elizabeth Mackes, Crofton, MD (US); Stacy Marie Ross, Cropwell, AL (US)

(73) Assignee: KLA CORPORATION, Milpitas, CA (US)

( * ) Notice: Subject to any disclaimer, the term of this patent is extended or adjusted under 35 U.S.C. 154(b) by 113 days.

(21) Appl. No.: 18/884,940

(22) Filed: Sep. 13, 2024

(65) Prior Publication Data

US 2025/0353040 A1 Nov. 20, 2025

Related U.S. Application Data

(60) Provisional application No. 63/649,464, filed on May 20, 2024, provisional application No. 63/649,456, filed on May 20, 2024.

(51) Int. Cl.
*B08B 3/02* (2006.01)
*B08B 3/08* (2006.01)
(Continued)

(52) U.S. Cl.
CPC ................. *B08B 3/02* (2013.01); *B08B 3/08* (2013.01); *B08B 5/04* (2013.01); *B08B 9/00* (2013.01)

(58) Field of Classification Search
CPC ........................................................ B08B 3/02
See application file for complete search history.

(56) References Cited

U.S. PATENT DOCUMENTS 6,659,116 B1 * 12/2003 Williams ............ H10P 72/0414 134/179

* cited by examiner

*Primary Examiner* — Jason Y Ko
(74) *Attorney, Agent, or Firm* — DICKINSON WRIGHT PLLC

(57) ABSTRACT

A cleaning device for an optical table includes a manifold defining a fluid and vacuum passage, and a nozzle assembly fluidly coupled to the fluid passage. The nozzle assembly includes a nozzle that engages at least one hole formed in the optical table. A vacuum assembly is fluidly coupled to the vacuum passage via a vacuum outlet, and generates a vacuum within the at least one hole formed in the optical table. A fluid inlet is fluidly coupled to the fluid passage, and provides a cleaning fluid to the nozzle. A plurality of alignment rods extend from a manifold distal end of the manifold and engage with a surface of the optical table. The fluid inlet provides the cleaning fluid to the nozzle of the nozzle assembly and the vacuum outlet generates the vacuum within the at least one of hole formed in the optical table simultaneously.

20 Claims, 9 Drawing Sheets

(51) Int. Cl.
*B08B 5/04* (2006.01)
*B08B 9/00* (2006.01)

OPTICAL TABLE CLEANING DEVICES AND METHODS OF CLEANING OPTICAL TABLES

CROSS-REFERENCE TO RELATED APPLICATIONS

This application claims priority to and the benefit of U.S. Prov. App. No. 63/649,464, filed May 20, 2024, and U.S. Prov. App. No. 63/649,456, filed May 20, 2024, which are incorporated herein by reference in their entireties.

FIELD OF THE INVENTION

The embodiments described herein relate to optical tables and, more specifically, to cleaning devices and methods of cleaning holes formed in optical tables.

BACKGROUND

Optical tables are utilized in various high-precision environments, including semiconductor manufacturing, laser optics, and other fields requiring vibration isolation and stability for sensitive equipment. Traditional optical tables are designed with an array of spaced, threaded, conical holes that allow for the secure mounting and alignment of optical table equipment. The cleanliness of these holes may impact the precision of operations performed on the optical table, as contamination may adversely impact the performance and accuracy of the equipment mounted on the table. Conventional methods for cleaning optical table holes involves extensive manual labor, typically using small brushes, swabs, or compressed air to remove contaminants. Not only is this manual process time-consuming, but the cleanliness achieved using manual labor is highly inconsistent due to the reliance on the diligence and/or skill of an operator. As typical optical tables may include thousands of holes, cleaning a single optical table may take several hours to complete. Furthermore, manual cleaning often fails to reach deeper portions of each of the holes, which may result in a buildup of contamination that may compromise performance of the optical table over time.

Accordingly, a need exists for an optical table cleaning device that is configured to quickly clean an optical table while maintaining the cleanliness standards of cleanroom environments in which an optical table may operate.

SUMMARY OF THE INVENTION

In the embodiments described herein, a cleaning device for an optical table is disclosed. The cleaning device includes a manifold defining a fluid and vacuum passage, and a nozzle assembly fluidly coupled to the fluid passage. The nozzle assembly includes a nozzle that engages at least one hole formed in the optical table. A vacuum assembly is fluidly coupled to the vacuum passage via a vacuum outlet, and generates a vacuum within the at least one hole formed in the optical table. A fluid inlet is fluidly coupled to the fluid passage, and provides a cleaning fluid to the nozzle. A plurality of alignment rods extend from a manifold distal end of the manifold and engage with a surface of the optical table. The fluid inlet provides the cleaning fluid to the nozzle of the nozzle assembly and the vacuum outlet generates the vacuum within the at least one of hole formed in the optical table simultaneously.

In other embodiments described herein, a cleaning device for an optical table is disclosed. The cleaning device includes a top plate, a base plate, and a plurality of vacuum assemblies. The plurality of vacuum assemblies include a vacuum outlet extending through at least a portion of the top plate. The cleaning device further includes a plurality of nozzle assemblies, the plurality of nozzle assemblies being fluidly coupled to the plurality of vacuum assemblies and each including a nozzle configured to engage at least one hole of a plurality of holes formed in the optical table. The cleaning device further includes a gear assembly mechanically coupled to the plurality of nozzle assemblies, such that the gear assembly is configured to rotate the plurality of nozzle assemblies.

In further embodiments, a method of cleaning at least one hole formed in an optical table is disclosed. The method includes aligning a cleaning device having a nozzle assembly and a vacuum assembly with the optical table, such that a nozzle of the nozzle assembly is aligned with the at least one hole; lowering the cleaning device onto the optical table such that the nozzle of the nozzle assembly is inserted within the at least one hole; activating the nozzle assembly such that a cleaning fluid is supplied to the at least one hole; and activating the vacuum assembly such that a vacuum is generated within the at least one hole; wherein the nozzle assembly and the vacuum assembly are activated simultaneously.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein relate to optical tables, cleaning devices for optical tables, and methods of cleaning optical tables. In the embodiments described herein, a the cleaning device may include manifold coupled to a nozzle assembly and a vacuum assembly, with the nozzle assembly being configured to provide a cleaning fluid to at least one hole formed in the optical table and the vacuum assembly being configured to generate a vacuum within the at least one hole formed in the optical table. In the embodiments described herein, the cleaning solution and the vacuum may be provided and generated simultaneously, which may enhance the cleaning efficiency of the disclosed cleaning device. Furthermore, in embodiments, the cleaning device may include any number of nozzle assemblies and vacuum assemblies, such that the cleaning device is able to clean a plurality of holes formed on the optical table simultaneously.

As noted hereinabove, traditional optical tables may include a number of holes that require regular cleaning to maintain precision and performance standards of the optical table. However, traditional cleaning methods utilize time consuming manual processes, and the cleanliness achieved using manual labor is highly inconsistent due to the reliance on the diligence and/or skill of an operator. The cleaning device described herein aims to address these shortcomings by providing an automated device that ensures each hole formed in an optical table is thoroughly cleaned to comply with relevant cleanroom standards. The cleaning device may reduce the amount of time required to clean the numerous holes formed in an optical table while also providing consistent and thorough cleaning of each of the holes. Furthermore, the cleaning device may include alignment mechanisms configured to ensure precise positioning of the cleaning device relative the holes of the optical table, which may further minimize the risk of damage to the optical table during cleaning.

Embodiments of cleaning devices for optical tables and methods of cleaning optical tables will now be described in additional detail herein. The following describes the cleaning devices and methods in more detail with reference to the drawings and where like numbers refer to like structures.

Figure 1B:
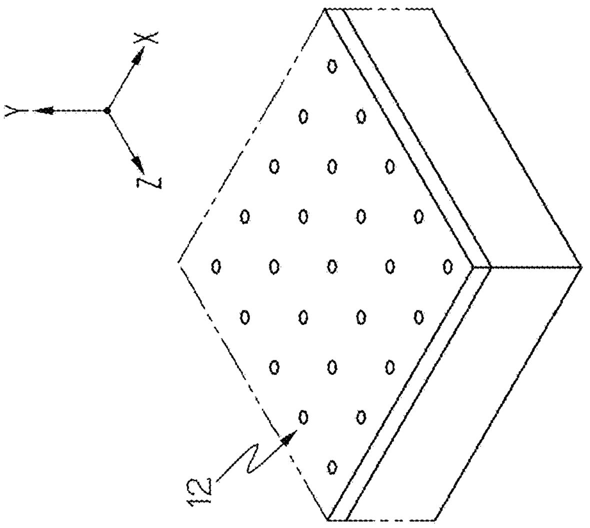
FIG. 1B is a partial perspective view of a portion of the optical table of FIG. 1A, according to one or more embodiments shown and described herein.
Figure 1A:
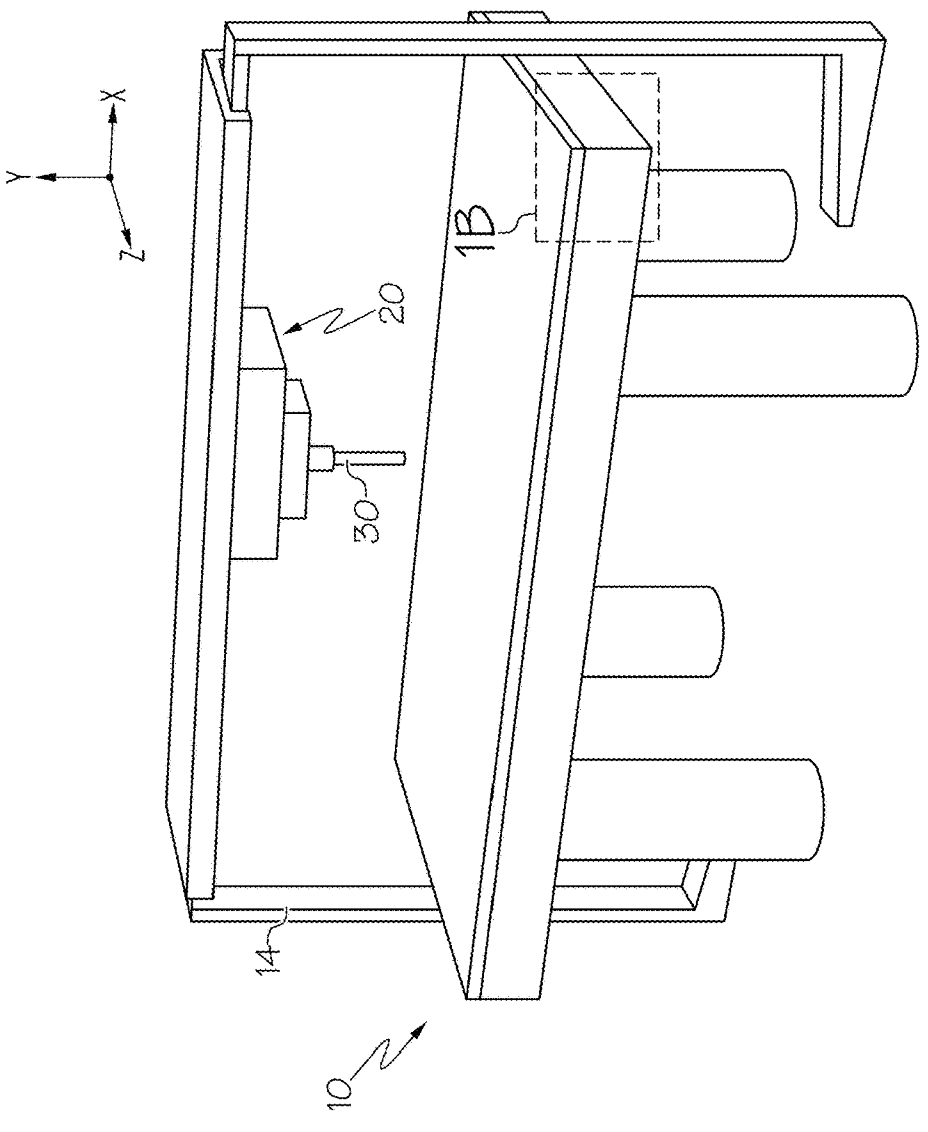
FIG. 1A is a perspective view of an optical table and cleaning device, according to one or more embodiments shown and described herein.

Referring now to FIGS. 1A and 1B, an optical table 10 and a cleaning device 20 configured to clean a plurality of holes 12 formed in the optical table 10 are depicted. In these embodiments, the cleaning device 20 may include a nozzle assembly 30 having at least one nozzle 40, with the at least one nozzle 40 being insertable within each of the plurality of holes 12 formed in the optical table 10. Once inserted into any of the plurality of holes 12 formed in the optical table 10, the nozzle assembly 30 may direct a fluid, such as a pressurized fluid, into the at least one of the plurality of holes 12 to dislodge and/or remove debris, particulates, and/or other contaminants positioned with the at least one of the plurality of holes 12. Operation of the nozzle assembly 30 and cleaning device 20 will be described in additional detail herein with reference to FIGS. 2A-6B.

As further depicted in FIGS. 1A and 1B, the cleaning device 20 may be mounted on a stage 14, such that the cleaning device 20 may be translated in a longitudinal direction (e.g., in the +/−x-direction as depicted in the coordinate axes of FIGS. 1A and 1B) or a lateral direction (e.g., in the +/−z-direction as depicted in the coordinate axes of FIGS. 1A and 1B) across a surface of the optical table 10. Furthermore, once the cleaning device 20 is aligned with the optical table 10, the stage 14 may be further configured to translate the cleaning device in a vertical direction (e.g., in the +/−y-direction as depicted in the coordinate axes of FIGS. 1A and 1B) such that the nozzle assembly 30 of the cleaning device 20 may be inserted into at least one of the plurality of holes 12 formed in the optical table 10, as will be described in additional detail herein. In these embodiments, the stage 14 may include a mechanical arm, platform, or any other similar mechanism configured to translate the cleaning device 20 across the optical table 10 (e.g., in the lateral and/or longitudinal direction) and into and out of engagement with each of the plurality of holes 12. It should be appreciated that, in the embodiments described herein, the stage 14 may provide the cleaning device 20 a range of motion (e.g., in the lateral and longitudinal directions) commensurate with an area of a top surface of the optical table 10, such that the cleaning device 20 may engage each of the plurality of holes 12. Alignment of the cleaning device 20 with the plurality of holes 12 will be described herein in additional detail with reference to FIGS. 3A and 3B.

Although the cleaning device 20 of FIGS. 1A and 1B is depicted as being disposed upon the stage 14, it should be appreciated that, in some embodiments, the cleaning device 20 may be utilized independently of a stage 14 or any similar mechanism. For example, in these embodiments, the cleaning device 20 may be manually translated across the optical table 10 and into alignment with each of the plurality of holes 12 formed in the optical table 10.

Figure 2B:
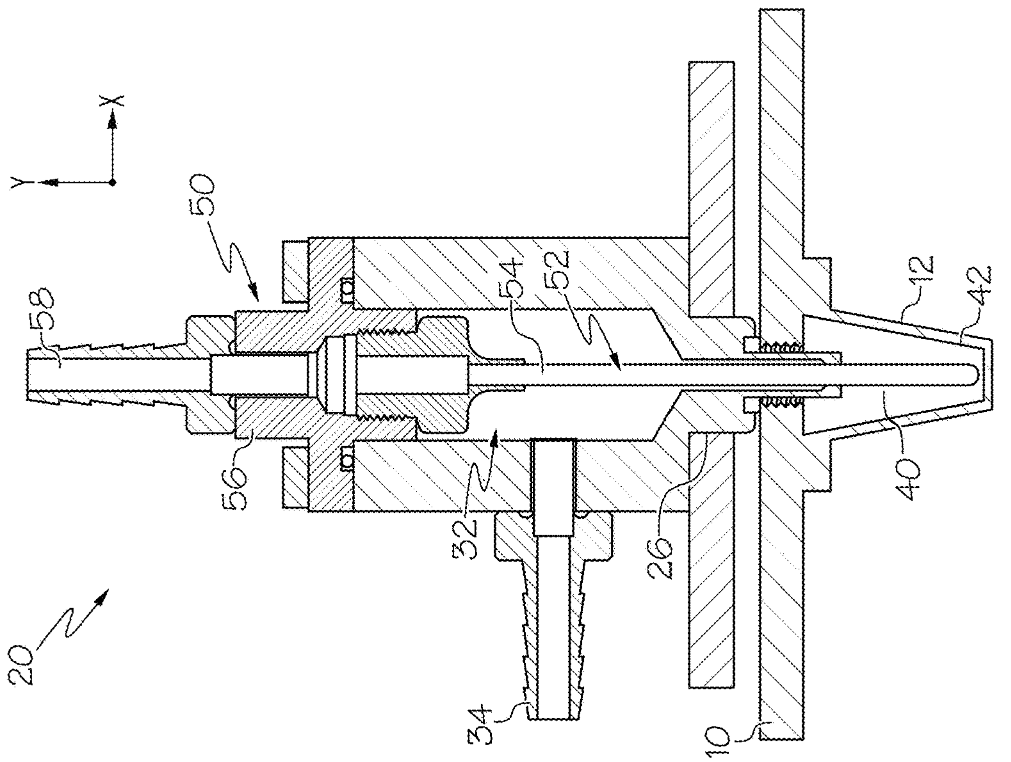
FIG. 2B is a cross-sectional view of the nozzle assembly of FIG. 2A, according to one or more embodiments shown and described herein.
Figure 2A:
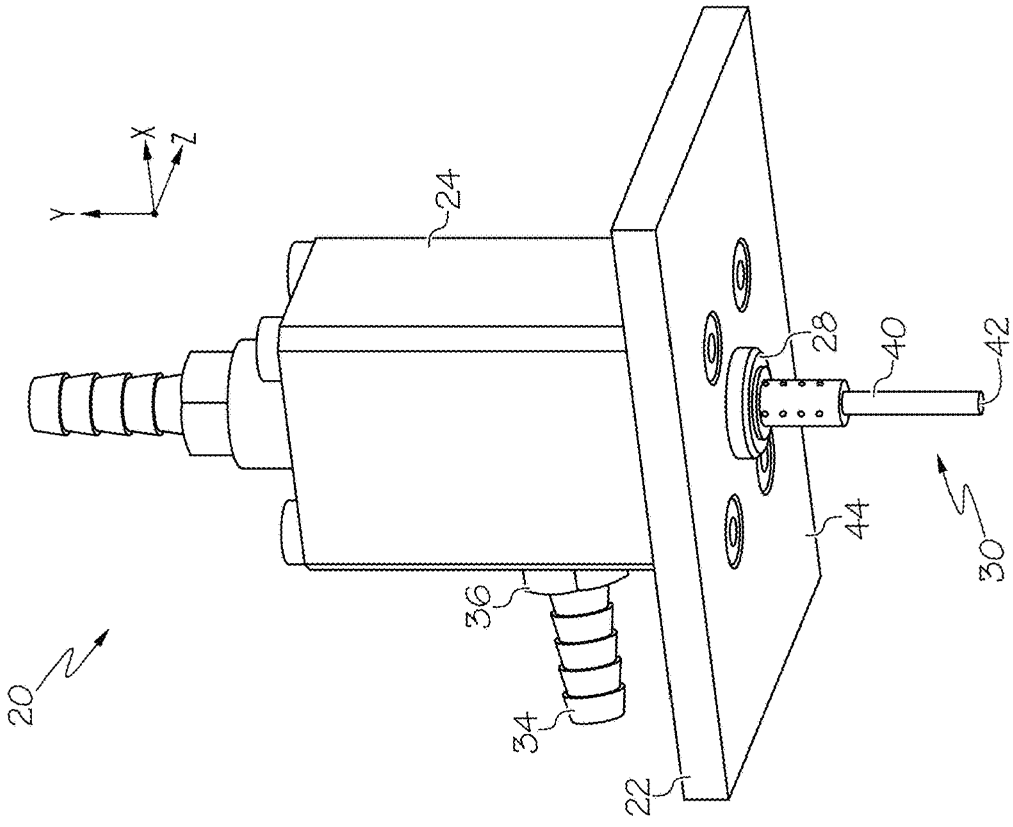
FIG. 2A is a perspective view of a nozzle assembly of the cleaning device of FIG. 1A, according to one or more embodiment shown and described herein.

Referring now to FIGS. 2A and 2B, the cleaning device 20 is depicted in additional detail. As shown in FIGS. 2A and 2B, the cleaning device 20 includes a base plate 22, which is configured to contact the top surface of the optical table 10 when the cleaning device 20 is aligned with at least one of the plurality of holes 12 formed in the optical table 10. In these embodiments, contact between the base plate 22 and the top surface of the optical table 10 may aid in ensuring that the cleaning device 20 is properly aligned before the cleaning device 20 is activated.

As further illustrated in FIGS. 2A and 2B, the cleaning device 20 may further include a manifold 24 configured to engage with the nozzle assembly 30 and a vacuum assembly 50. For example, as illustrated most clearly in FIG. 2B, the manifold 24 may include a manifold 24 extending between a manifold distal end 24*a* and a manifold proximal end 24*b*. In these embodiments, the base plate 22 may further include a base plate opening 26, with the manifold distal end 24*a* of the manifold 24 extending at least partially through (e.g., in the −y-direction as depicted in the coordinate axes of FIGS. 2A and 2B) the base plate 22. As further depicted in FIGS. 2A and 2B, the cleaning device 20 may further include a sealing mechanism 28, such as an O-ring or any other suitable fluid-tight sealing mechanism, positioned at the interface of the manifold distal end 24*a* and the base plate opening 26. In these embodiments, the sealing mechanism 28 may aid in ensuring that fluid that is directed into the plurality of holes 12 formed on the optical table 10 does not leak from the cleaning device 20 during operation, as will be described in additional detail herein.

Referring still to FIGS. 2A and 2B, the manifold 24 may further define a fluid passage 32 and a vacuum passage 52. In these embodiments, the fluid passage 32 may be fluidly coupled to the nozzle assembly 30, such that fluid input to the fluid passage 32 may be directed into the plurality of holes 12 formed on the optical table 10 via the nozzle assembly 30. Furthermore, the vacuum passage 52 may be fluidly coupled to the vacuum assembly 50, such that fluid which has been used to clean the plurality of holes 12 formed in the optical table 10 may be evacuated from the manifold 24 via the vacuum assembly 50, as will be described in additional detail herein.

Referring still to FIGS. 2A and 2B, the nozzle assembly 30 may further include the nozzle 40, which may include a nozzle tip 42, such as a conical tip, or any other tip sized and shaped to be insertable within each of the plurality of holes 12 formed on the optical table 10. As depicted most clearly in FIG. 2B, the nozzle 40 may be secured to the manifold distal end 24*a* (e.g., via threaded engagement or any other similar engagement), such that the nozzle 40 is in fluid communication with the fluid passage 32 defined within the manifold 24. In these embodiments, the nozzle 40 may further define a plurality of nozzle openings 44 extending about the nozzle 40 in a circumferential direction, such that fluid may be expelled from the plurality of nozzle openings 44 about an entire circumference of the nozzle 40 (e.g., and the at least one of the plurality of holes 12 in which the nozzle 40 is inserted) without needing to move and/or rotate the cleaning device 20 or nozzle assembly 30.

As further depicted in FIGS. 2A and 2B, the cleaning device 20 may further include a fluid inlet 34 that is fluidly coupled to the fluid passage 32 defined in the manifold 24 of the cleaning device 20. In these embodiments, the fluid inlet 34 may be used to provide a cleaning solution (e.g., fluid) to the fluid passage 32 defined in the manifold 24 of the cleaning device 20, at which point the fluid may be dispensed within at least one of the plurality of holes 12 formed in the optical table 10 via the nozzle assembly 30. As illustrated in FIGS. 2A and 2B, the fluid inlet 34 may further include a fluid control valve 36, which may be configured to regulate the flow of fluid into the fluid passage 32 and, in turn, through the nozzle assembly 30. In the embodiments described herein, the cleaning solution may include isopropyl alcohol, air (e.g., compressed air), or any other fluid capable of dislodging particulates and/or other contaminants lodged within the at least one of the plurality of holes 12.

Referring still to FIGS. 2A and 2B, the vacuum assembly 50 may further include a vacuum tube 54, a vacuum outlet 58, and a vacuum adaptor 56 configured to couple the vacuum tube 54 to the vacuum outlet 58. For example, as depicted most clearly in FIG. 2B, the vacuum adaptor 56 may be coupled to the manifold proximal end 24*b* of the manifold 24 in order to form a seal between the vacuum assembly 50 and the manifold 24. Furthermore, the vacuum tube 54 may be fluidly coupled to the vacuum outlet 58 via the vacuum adaptor 56, such that vacuum may be generated within the vacuum passage 52, as will be described in additional detail herein.

For example, in the embodiments described herein, the vacuum tube 54 may extend in a lateral direction (e.g., in the +/−y-direction as depicted in the coordinate axes of FIGS. 2A and 2B) from the vacuum adaptor 56 and through the manifold distal end 24*a* of the manifold 24, such that the vacuum tube 54 extends at least partially into the nozzle 40 of the nozzle assembly 30. The vacuum outlet 58 may then activate a pump (not depicted) or any other similar device capable of generating a vacuum, such that a vacuum is formed within the vacuum tube 54. In these embodiments, fluid provided through the nozzle 40 of the nozzle assembly 30 may be evacuated (e.g., pumped) from the at least one of the plurality of holes 12 in which the cleaning device 20 is positioned via the vacuum tube 54, along with any particulate and/or contaminants dislodged from the at least one of the plurality of holes 12 during operation of the cleaning device 20.

It should be further understood that, during operation of the cleaning device 20, fluid from the fluid inlet 34 and vacuum from the vacuum outlet 58 may be supplied to the manifold 24 (and in turn, to the at least one of the plurality of holes 12) simultaneously. For example, in the embodiments described herein, the simultaneous flow of fluid through the nozzle 40 combined with the presence of vacuum via the vacuum tube 54 may allow for more efficient cleaning of the plurality of holes 12. In these embodiments, the cleaning fluid supplied to the at least one of the plurality of holes 12 (e.g., isopropyl alcohol, air, etc.) may begin to dissolve and/or dislodge particulate positioned within the at least one of the plurality of holes 12 upon contact with the particulate. However, applying fluid independently of the vacuum may result in the particulate becoming suspended in the cleaning fluid and/or adhered to the at least one of the plurality of holes 12. Accordingly, it should be appreciated that the simultaneous application of fluid and vacuum to the at least one of the plurality of holes 12 may aid in ensuring that particulate is removed during the cleaning process, which may enhance the cleanliness of the at least one of the plurality of holes 12.

Figure 3A:
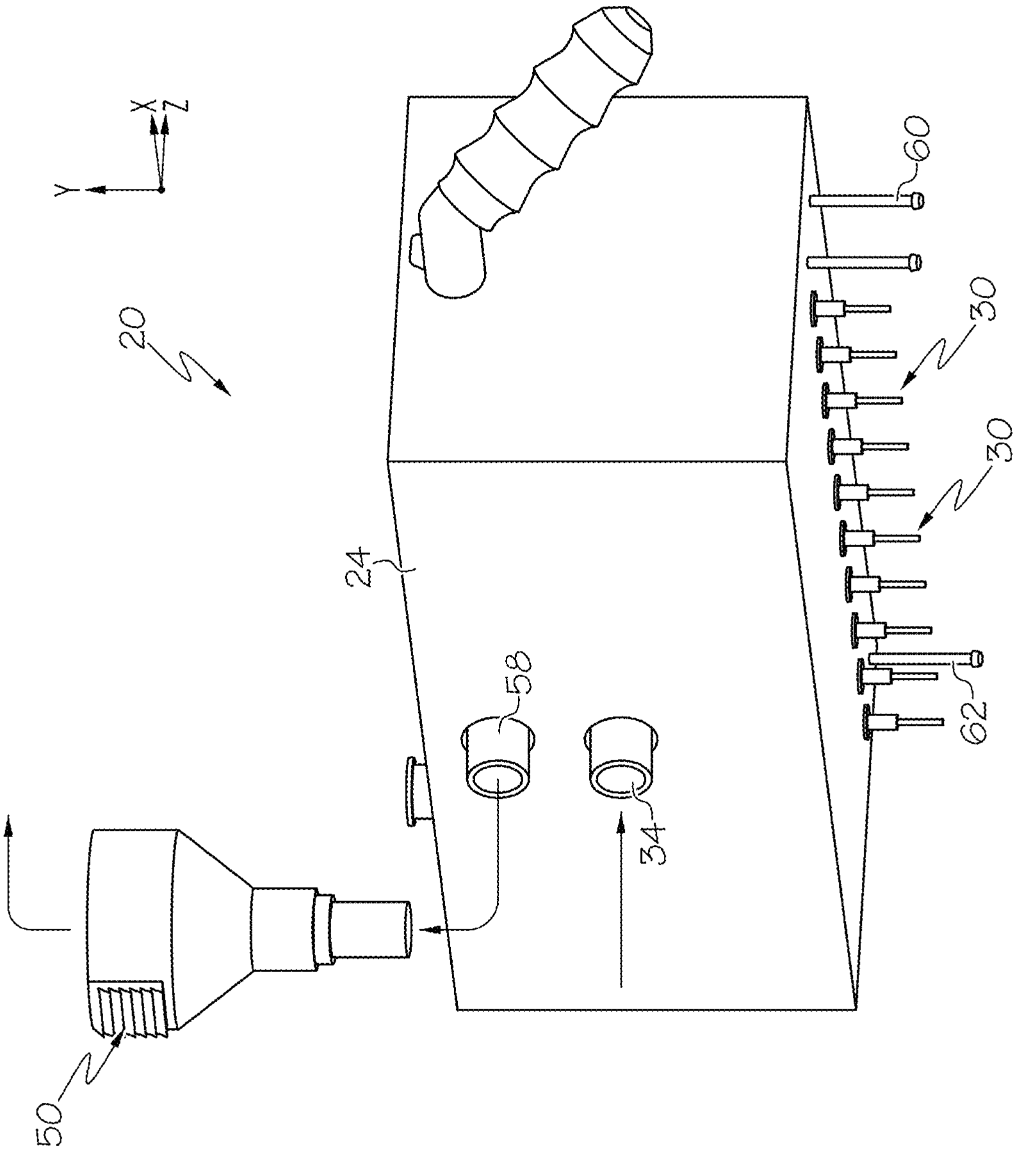
FIG. 3A is perspective view of the cleaning device of FIG. 1A, according to one or more embodiments shown and described herein.

Referring now to FIG. 3A, another embodiment of the cleaning device 20 is depicted. In these embodiments, the cleaning device 20 may include a plurality of nozzle assemblies 30, such that the cleaning device 20 is configured to supply fluid to multiple holes of the plurality of holes 12 simultaneously. For example, in this embodiment, the cleaning device 20 may include a plurality of nozzles 40 coupled to the fluid passage 32 formed within the manifold 24, and a plurality of vacuum tubes 54 may extend through each of the plurality of nozzles 40, such that fluid and vacuum may be simultaneously provided to each of the plurality of holes 12 in which the cleaning device 20 is inserted, as has been described herein. In these embodiments, it should be appreciated that the plurality of vacuum tubes 54 may be fluidly coupled to a common vacuum adaptor 56 that is coupled to the vacuum outlet 58. In other embodiments, each of the plurality of vacuum tubes 54 may be associated with an individual vacuum adaptor 56, with each of the vacuum adaptors 56 being fluidly coupled to the vacuum outlet 58. It should be appreciated that, in the embodiment depicted in FIG. 3A, the cleaning device 20 may include any number of nozzle assemblies 30 without departing from the scope of the present disclosure.

In the embodiment depicted in FIG. 3A, it should be further appreciated that the fluid flow and vacuum pressure supplied to each of the plurality of nozzle assemblies 30 may be the same for each of the plurality of nozzle assemblies 30 and the plurality of vacuum tubes 54, respectively. For example, although the cleaning device 20 includes a plurality of nozzle assemblies 30 and a plurality of vacuum tubes 54, the manifold 24 of the cleaning device 20 includes a single fluid inlet 34 and a single vacuum outlet 58. Accordingly, the vacuum outlet 58 may generate equal vacuum pressure in each of the plurality of the vacuum tubes 54, while the fluid inlet 34 may provide an equal flow rate of fluid to each of the plurality of nozzle assemblies 30.

Referring still to FIG. 3A, the cleaning device 20 may further include a plurality of alignment rods 60 extending from the manifold distal end 24*a* of the manifold 24 (e.g., in the −y-direction as depicted in the coordinate axis of FIG. 3A). In these embodiments, the plurality of alignment rods 60 may be used to align the plurality of nozzle assemblies 30 with the plurality of holes 12 formed in the optical table 10. For example, the plurality of alignment rods 60 may contact the top surface of the optical table 10 when the cleaning device 20 is lowered to engage the plurality of holes 12 formed in the optical table.

In these embodiments, the plurality of alignment rods 60 may include a spring mechanism 62, such that the plurality of alignment rods 60 may compress as the plurality of alignment rods 60 contact the surface of the optical table 10. For example, as the cleaning device 20 is lowered, the plurality of alignment rods 60 may engage positioning markers (e.g., holes, grooves, notches, etc.) formed on the top surface of the optical table 10, with contact between the positioning markers and the plurality of alignment rods 60 ensuring that the plurality of nozzle assemblies 30 are in alignment with the plurality of holes 12. As the cleaning device 20 continues to lower, contact between the plurality of alignment rods 60 and the positioning markers may cause the spring mechanism 62 of each of the plurality of alignment rods 60 to compress, such that the plurality of nozzle assemblies 30 may be engaged with the plurality of holes 12. In these embodiments, the spring mechanism 62 may ensure that the cleaning device 20 is firmly seated on the optical table 10 without exerting excessive force that may damage the surface of the optical table 10 or the plurality of nozzle assemblies 30.

Figure 3B:
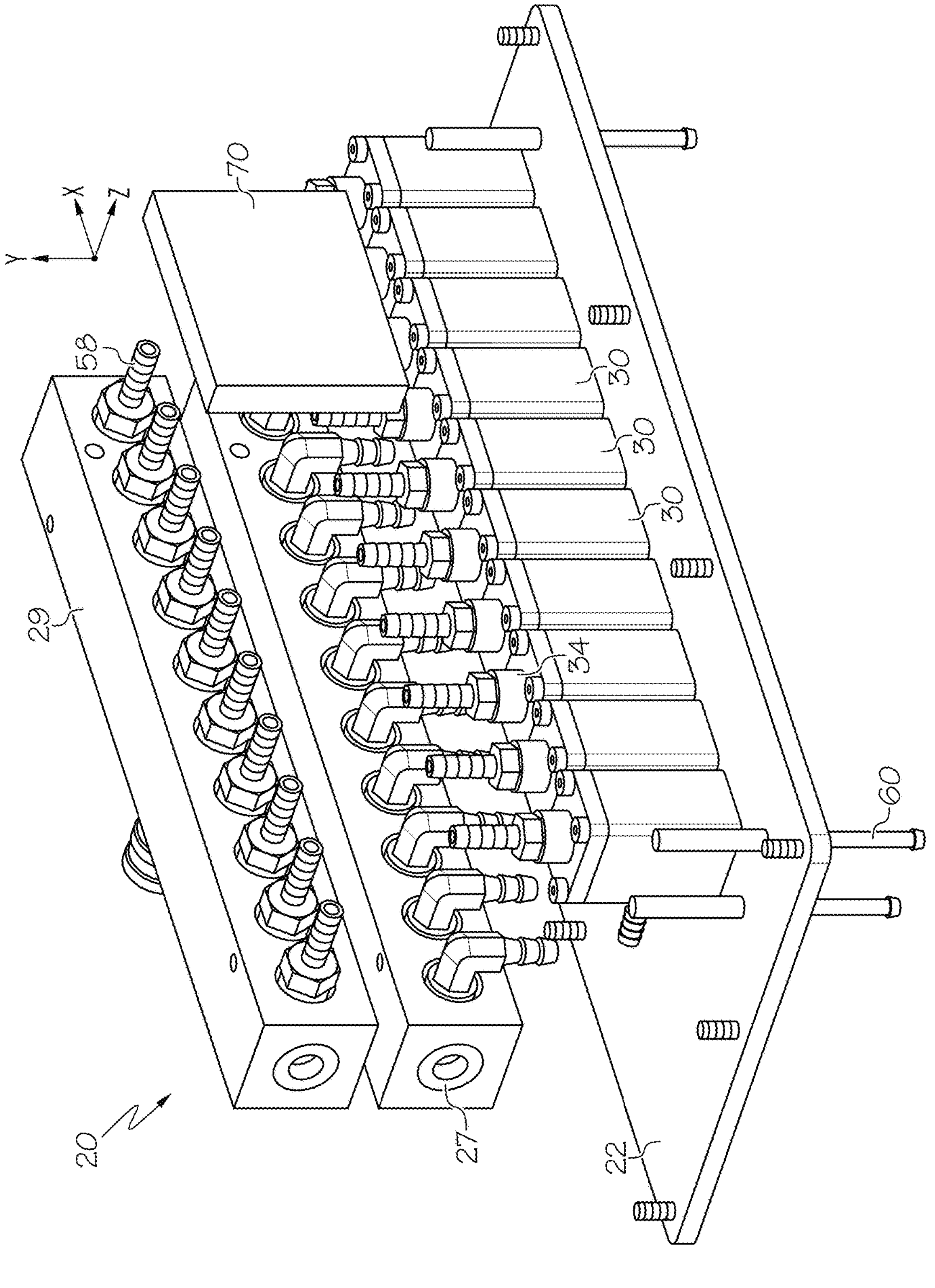
FIG. 3B is a perspective view of the cleaning device of FIG. 3A, according to one or more embodiments shown and described herein.

Turning now to FIG. 3B, another embodiment of the cleaning device 20 is depicted. In these embodiments, the cleaning device 20 may include a vacuum manifold 29 and a fluid manifold 27, with the vacuum manifold 29 being separate from the fluid manifold 27. Accordingly, in these embodiments, the fluid passage 32 may be formed within the fluid manifold 27, while the vacuum passage 52 may be formed within the vacuum manifold 29.

As further depicted in FIG. 3B, the fluid manifold 27 may include a plurality of fluid inlets 34 extending from the fluid manifold 27, with each of the fluid inlets 34 being associated with at least one of the plurality of nozzle assemblies 30. Similarly, the vacuum manifold 29 may include a plurality of vacuum outlets 58, with each of the vacuum outlets 58 associated with at least one of the plurality of vacuum tubes 54.

In these embodiments, the cleaning device 20 may further include a controller 70, such as a microcontroller, or any other similar controller configured to control a flow rate of fluid provided through the plurality of fluid inlets 34 and/or a vacuum pressure generated by the plurality of vacuum outlets 58. Accordingly, in these embodiments, the controller 70 may be configured to monitor and adjust the flow rate of fluid provided through each of the plurality of fluid inlets 34 and the vacuum pressure generated by each of the plurality of vacuum outlets 58. Because each of the plurality of fluid inlets 34 and each of the plurality of vacuum outlets 58 is associated with a separate one of the plurality of nozzle assemblies 30, in these embodiments, the controller 70 may adjust the fluid flow rate and vacuum pressure of each individual nozzle assembly of the plurality of nozzle assemblies 30.

For example, during operation of the cleaning device 20, each of the plurality of holes 12 formed in the optical table 10 may have varying volumes of contaminants or other particulates accumulated within each of the plurality of holes 12. Accordingly, by utilizing the controller 70 to adjust the fluid flow rate and vacuum pressure generated within each of the plurality of nozzle assemblies 30, it may be possible to ensure that each of the plurality of holes 12 is cleaned according to a desired cleanliness standard regardless of the volume of contaminants accumulated in any particular one of the plurality of holes 12.

Figure 4B:
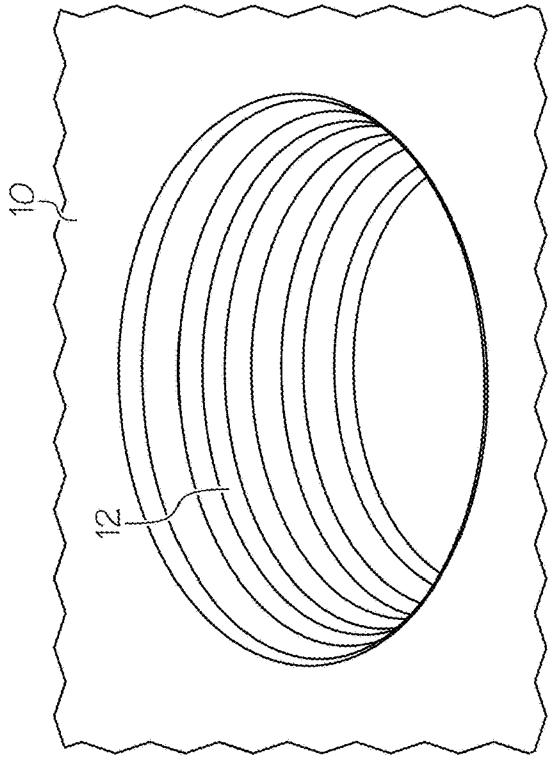
FIG. 4B is a perspective view of the at least one of the plurality of holes of FIG. 4A after treatment with the cleaning device of FIG. 1A, according to one or more embodiments shown and described herein.
Figure 4A:
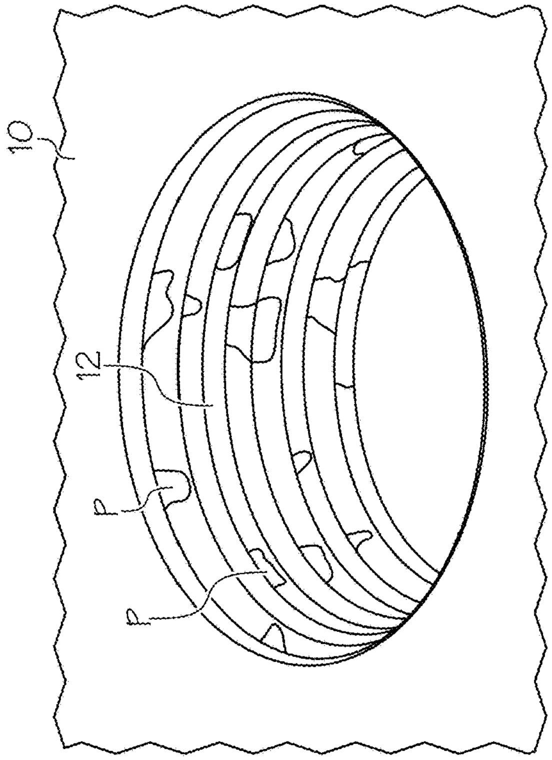
FIG. 4A is a perspective view of at least one of a plurality of holes formed in the optical table of FIG. 1A prior to treatment with the cleaning device, according to one or more embodiments shown and described herein.

Referring now to FIGS. 4A and 4B, an illustrative hole of the plurality of holes 12 is depicted prior to treatment with the cleaning device 20 (e.g., FIG. 4A) and after treatment with the cleaning device 20 (e.g., FIG. 4B). For example, as described in detail herein, during operation of the optical table 10, particulates P may accumulate within the plurality of holes 12, which may decrease the efficiency and performance of the optical table 10 over time. In these embodiments, the cleaning device 20 may be lowered onto the optical table 10, such that at least one of the nozzle assemblies 30 is inserted into at least one of the plurality of holes 12 formed on the optical table 10. With the nozzle assembly 30 aligned in the at least one of the plurality of holes 12, the cleaning device 20 may be activated, such that fluid and vacuum are simultaneously generated within the nozzle assembly 30. As has been described herein, the fluid may act to dissolve and/or dislodge the particulate P accumulated within the at least one of the plurality of holes 12, while the vacuum generated within the nozzle assembly 30 evacuates the fluid and particulate P from the at least one of the plurality of holes 12. Operation of the cleaning device 20 may be continued until the at least one of the plurality of holes 12 has achieved a desired cleanliness standard, as depicted in FIG. 4B.

Figure 5A:
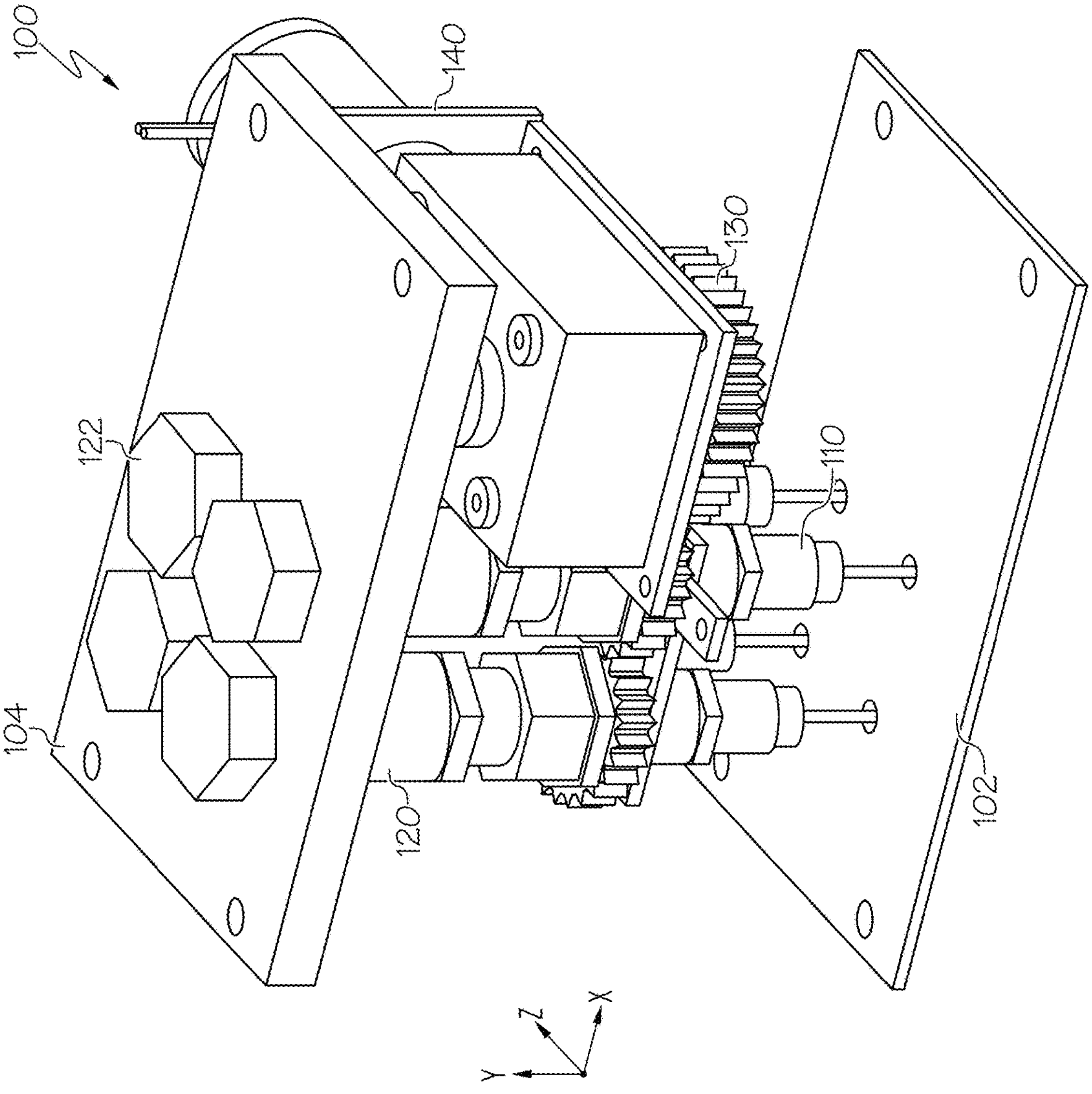
FIG. 5A is a perspective view of another embodiment of a cleaning device of the optical table of FIG. 1A, according to one or more embodiments shown and described herein.
Figure 5B:
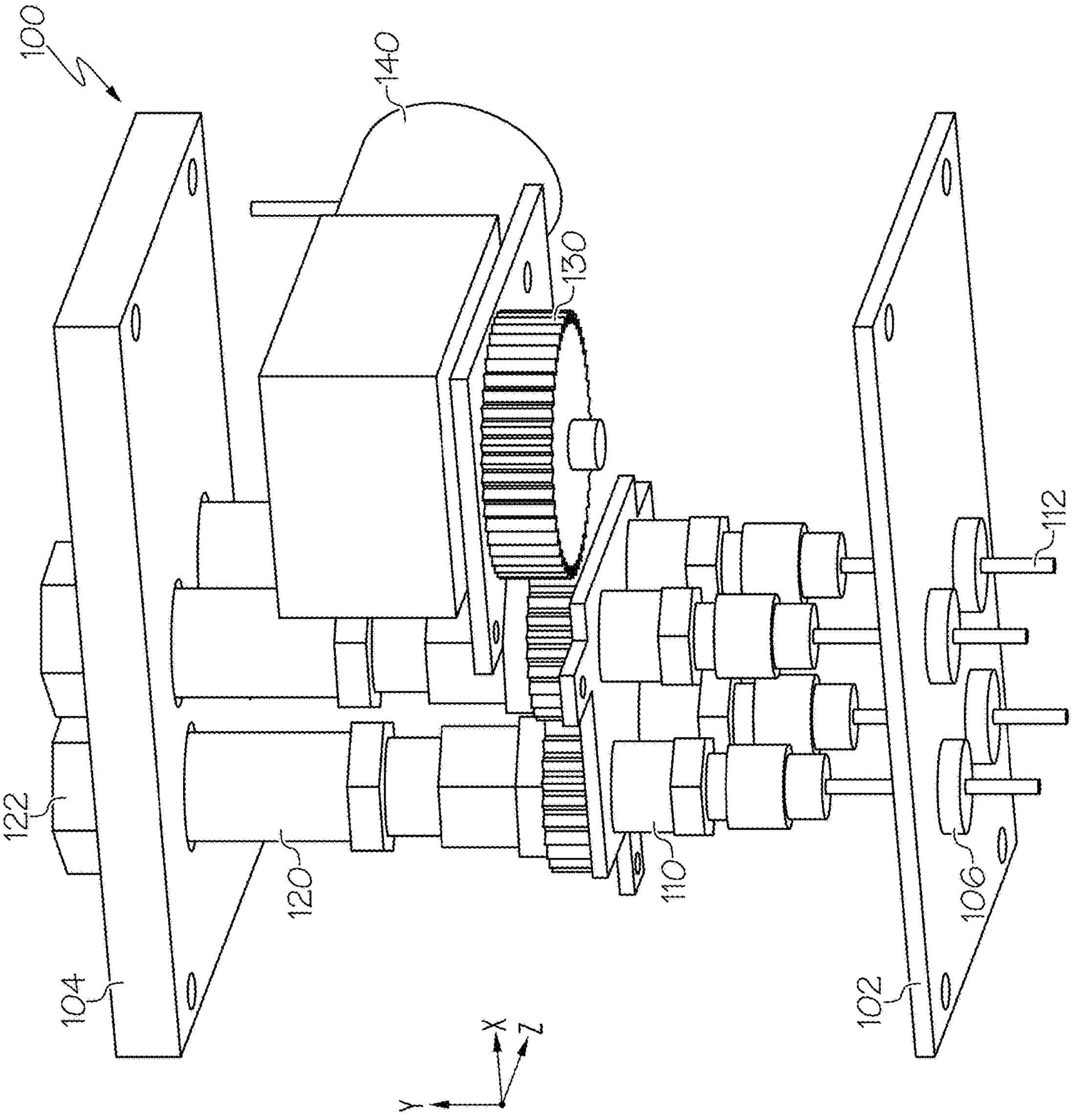
FIG. 5B is a perspective view of the cleaning device of FIG. 5A, according to one or more embodiments shown and described herein.

Turning now to FIGS. 5A and 5B, another embodiment of a cleaning device 100 is depicted. In these embodiments, the cleaning device 100 may include a base plate 102, a top plate 104, a plurality of nozzle assemblies 110, and a plurality of vacuum assemblies 120. As depicted in FIGS. 5A and 5B, in these embodiments, the plurality of nozzle assemblies 110 may be fluidly coupled to the plurality of vacuum assemblies 120, such that a vacuum outlet 122 of each of the plurality of vacuum assemblies 120 extends through (e.g., in the +y-direction as depicted in the coordinate axes of FIGS. 5A and 5B) the top plate 104 and a nozzle 112 of each of the plurality of nozzle assemblies 110 extends through (e.g., in the −y-direction as depicted in the coordinate axes of FIGS. 5A and 5B) the base plate 102. Furthermore, the cleaning device 100 may include a plurality of sealing mechanisms 106 configured to seal the nozzles 112 of the plurality of nozzle assemblies 110 and the base plate 102 through which the nozzles 112 extend.

It should be appreciated that, in these embodiments, the cleaning device 100 may operate in the same manner described herein with reference to FIGS. 1A-4B. For example, the cleaning device 100 may be lowered onto an optical table such that the nozzle 112 of each of the plurality of nozzles 112 engages at least one of a plurality of holes formed on the optical table. Once engaged with the optical table, fluid and vacuum may be simultaneously generated (e.g., via the plurality of vacuum assemblies 120 and the plurality of nozzle assemblies 110) within each of the plurality of holes 12 to dislodge and evacuate particulate and/or contaminants accumulated within each of the plurality of holes.

Referring still to FIGS. 5A and 5B, in these embodiments, the plurality of nozzle assemblies 110 may be arranged in an array, such that the cleaning device 100 is configured to treat multiple holes of the plurality of holes 12 formed on the optical table 10 simultaneously. For example, FIGS. 5A and 5B depict the plurality of nozzle assemblies 110 as being arranged in a 2×2 array. However, it should be appreciated that the plurality of nozzle assemblies 110 may be arranged in any sized array (e.g., 3×3, 3×2, 2×3, etc.) without departing from the scope of the present disclosure.

Referring now to FIGS. 5A-6B, the cleaning device 100 may further include a gear assembly 130 coupled to the plurality of nozzle assemblies 110. For example, the gear assembly 130 may include a primary gear 132 and a plurality of secondary gears 134, with each of the plurality of secondary gears 134 being associated with one of the plurality of nozzle assemblies 110, as will be described in additional detail herein. In these embodiments, the cleaning device 100 may further include a motor 140, which may be electromechanically coupled to the gear assembly 130 to drive the gear assembly 130. For example, as depicted most clearly in FIG. 6A, the primary gear 132 may be coupled to the motor 140, such that activation of the motor 140 drives the primary gear 132. In turn, at least one of the secondary gears 134 may be coupled to the primary gear 132, while each of the plurality of secondary gears 134 may be coupled to any adjacent gears of the plurality of secondary gears 134. Accordingly, rotation of the primary gear 132 may act to drive each of the plurality of secondary gears 134, as will be described in additional detail herein.

Figure 6B:
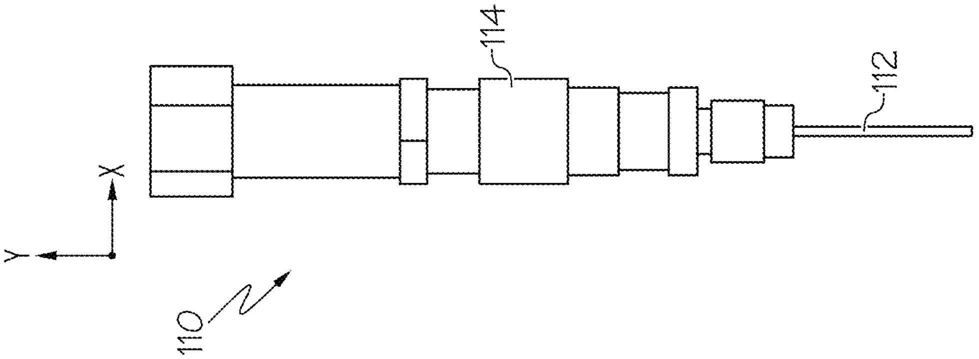
FIG. 6B is a front-side view of a rotating nozzle assembly of the cleaning device of FIG. 5A, according to one or more embodiments shown and described herein.
Figure 6A:
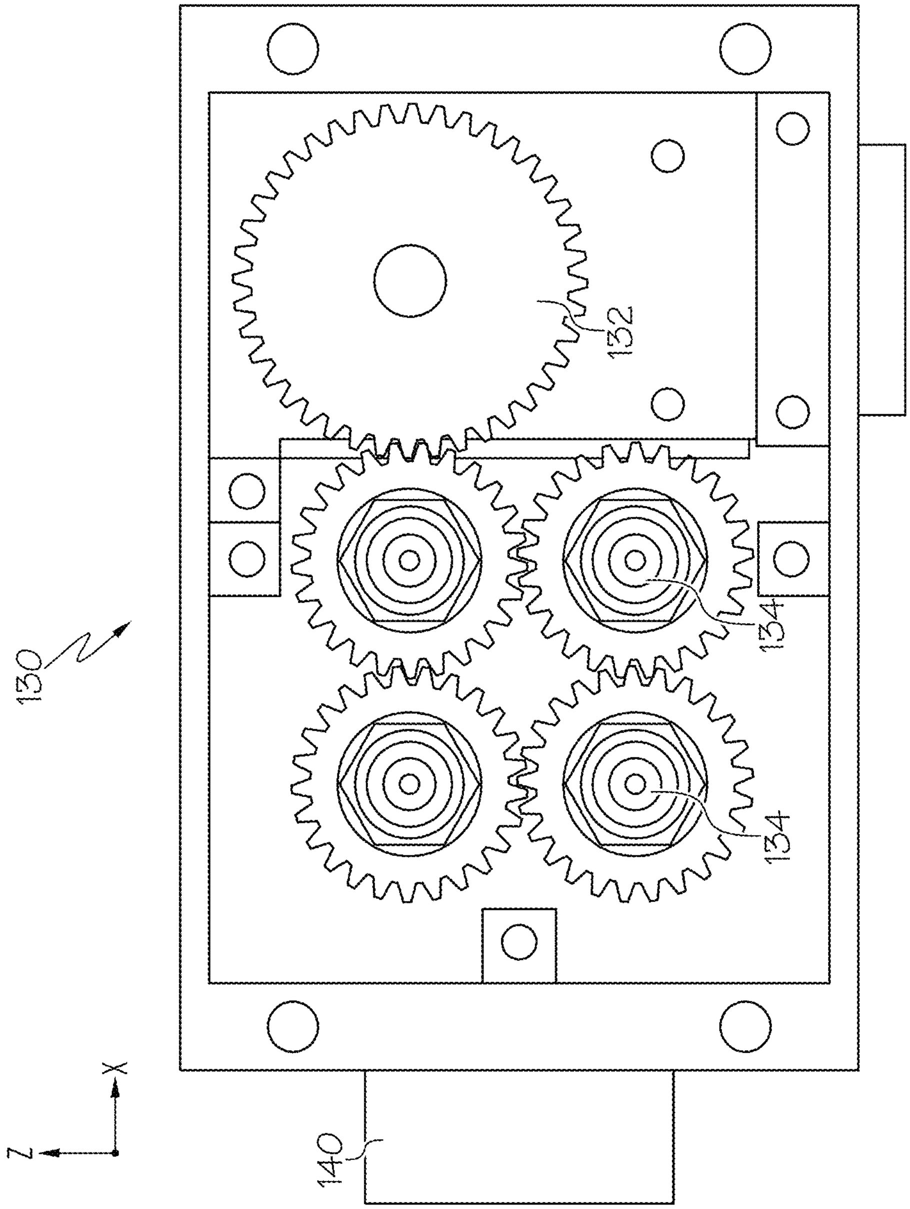
FIG. 6A is a bottom-side view of a gear assembly of the cleaning device of FIG. 5A, according to one or more embodiments shown and described herein.

As most clearly depicted in FIG. 6B, the plurality of nozzle assemblies 110 may further include a swivel mechanism 114, with the swivel mechanism 114 of each of the plurality of nozzle assemblies 110 being coupled to at least one of the plurality of secondary gears 134 of the gear assembly 130. Accordingly, in these embodiments, rotation of the plurality of secondary gears 134 may similarly cause rotation of the plurality of nozzle assemblies 110, and in turn, the nozzle 112 associated with each of the plurality of nozzle assemblies.

Referring now to FIGS. 5A and 5B, in operation, the cleaning device 100 may be aligned with the optical table 10 (e.g., via alignment rods, as described herein with reference to FIG. 3A or otherwise) and lowered such that the nozzle 112 of each of the nozzle assemblies 110 engages at least one hole of the plurality of holes 12 formed in the optical table 10. Once the cleaning device 100 is positioned, a fluid (e.g., compressed air, isopropyl alcohol, etc.) may be supplied through the nozzle 112 of the plurality of nozzle assemblies 110 and into each of the plurality of holes 12 which the cleaning device 100 has engaged. In these embodiments, the plurality of vacuum assemblies 120 may simultaneously generate vacuum within the plurality of holes 12 in order to evacuate fluid and particulate from each of the plurality of holes 12.

Furthermore, with the plurality of nozzle assemblies 110 engaged with the plurality of holes 12, the motor 140 may be activated to drive the gear assembly 130 of the cleaning device 100. As the motor 140 operates, the gear assembly 130 may rotate the nozzle assemblies 110 of the cleaning device 100, such that fluid is dispensed from the nozzle 112 of each of the plurality of nozzle assemblies 110 about an entire circumference of the at least one hole of the plurality of holes 12 in which the nozzle 112 is engaged. Accordingly, it should be appreciated that, in these embodiments, rotation of the nozzle 112 may ensure that the hole in which the nozzle 112 is engaged is adequately cleaned during the cleaning process.

Figure 7:
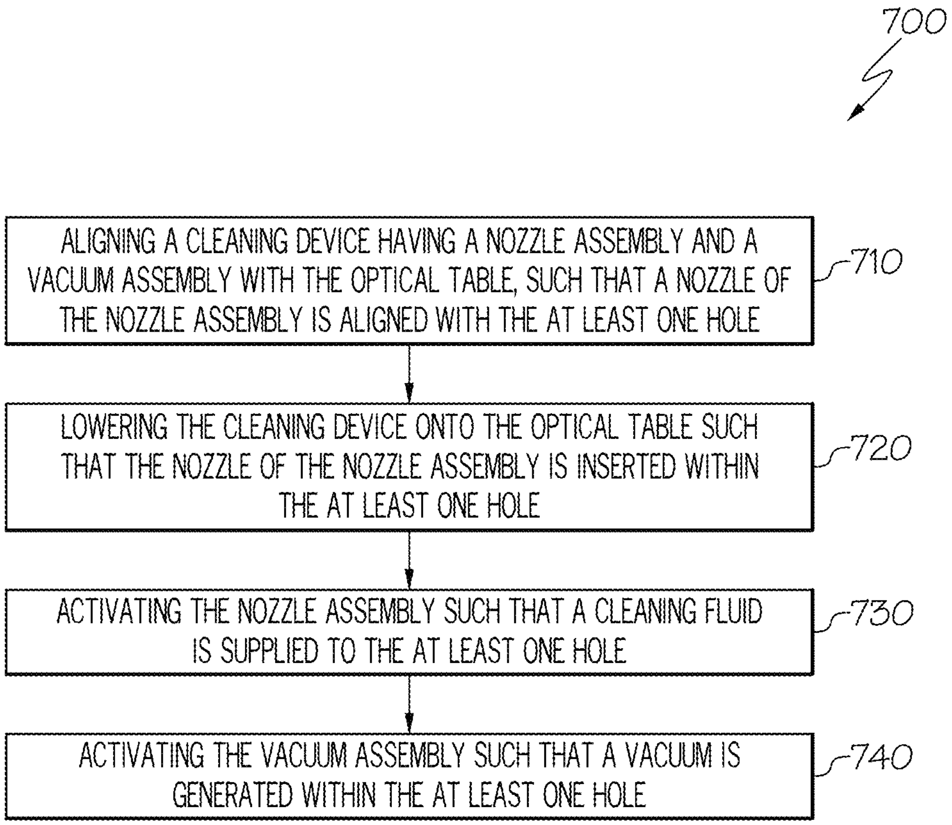
FIG. 7 is an illustrative flow diagram of a method of cleaning an optical table, according to one or more embodiments shown and described herein.

Referring now to FIG. 7, an illustrative flow diagram of a method 700 of cleaning a plurality of holes formed in an optical table is disclosed. As depicted at block 710, the method may initially involve aligning a cleaning device having a nozzle assembly and a vacuum assembly with the optical table, such that a nozzle of the nozzle assembly is aligned with at least one hole of the plurality of holes formed in the optical table.

With the cleaning device aligned, the method may proceed to block 720, which may involve lowering the cleaning device onto the optical table such that the nozzle of the nozzle assembly is inserted into the at least one hole. In these embodiments, the method steps of aligning and lowering the cleaning device may further involve engaging a plurality of alignment rods extending from the cleaning device with a plurality of positioning markers formed on the optical table.

Once the nozzle is inserted within the at least one hole, the method may proceed to block 730, which may involve activating the nozzle assembly such that a cleaning fluid is supplied to the at least one hole. In these embodiments, the method may also advance to block 740, which may involve activating the vacuum assembly such that a vacuum is generated within the at least one hole. It should be appreciated that, in the embodiments described herein, the method steps of activating the nozzle assembly and activating the vacuum assembly (e.g., as depicted at blocks 730 and 740) may be completed simultaneously.

In view of the foregoing, it should be appreciated that the embodiments described herein are related to cleaning devices for optical tables and methods of cleaning optical devices using the cleaning device disclosed herein. The cleaning device may include a manifold coupled to a nozzle assembly and a vacuum assembly, with the nozzle assembly being configured to provide a cleaning fluid to at least one hole formed in the optical table and the vacuum assembly being configured to generate a vacuum within the at least one hole formed in the optical table. In the embodiments described herein, the cleaning solution and the vacuum may be provided and generated simultaneously, which may enhance the cleaning efficiency of the disclosed cleaning device. Furthermore, in embodiments, the cleaning device may include any number of nozzle assemblies and vacuum assemblies, such that the cleaning device is able to clean a plurality of holes formed on the optical table simultaneously.

The embodiments disclosed herein may be further described with reference to the following aspects:

According to one aspect of the disclosure, and potentially in combination with other disclosed aspects of the disclosure, a cleaning device for an optical table is disclosed, the cleaning device comprising: a manifold defining a fluid passage and a vacuum passage; a nozzle assembly fluidly coupled to the fluid passage, the nozzle assembly including a nozzle configured to engage at least one hole formed in the optical table; a vacuum assembly fluidly coupled to the vacuum passage via a vacuum outlet, the vacuum outlet being configured to generate a vacuum within the at least one hole formed in the optical table; a fluid inlet fluidly coupled to the fluid passage, the fluid inlet being configured to provide a cleaning fluid to the nozzle of the nozzle assembly; and a plurality of alignment rods extending from a manifold distal end of the manifold, the plurality of alignment rods being engageable with a surface of the optical table; wherein the fluid inlet provides the cleaning fluid to the nozzle of the nozzle assembly and the vacuum outlet generates the vacuum within the at least one of hole formed in the optical table simultaneously.

According to one aspect of the disclosure, and potentially in combination with other disclosed aspects of the disclosure, the cleaning fluid is isopropyl alcohol.

According to one aspect of the disclosure, and potentially in combination with other disclosed aspects of the disclosure, a base plate coupled to a manifold distal end of the manifold, such that the base plate contacts a top surface of the optical table when the nozzle of the nozzle assembly is engaged with the at least one hole formed in the optical table.

According to one aspect of the disclosure, and potentially in combination with other disclosed aspects of the disclosure, the plurality of alignment rods engage a plurality of positioning markers formed on the optical table and align the nozzle of the nozzle assembly with the at least one hole.

According to one aspect of the disclosure, and potentially in combination with other disclosed aspects of the disclosure, of the plurality of alignment rods include a spring mechanism that compresses when each of the plurality of alignment rods contact the plurality of positioning markers formed on the optical table.

According to one aspect of the disclosure, and potentially in combination with other disclosed aspects of the disclosure, the nozzle assembly includes a plurality of nozzle assemblies, the vacuum assembly includes a plurality of vacuum assemblies, and the at least one hole includes a plurality of holes.

According to one aspect of the disclosure, and potentially in combination with other disclosed aspects of the disclosure, the plurality of nozzle assemblies are fluidly coupled to the fluid inlet and the plurality of vacuum assemblies are fluidly coupled to the vacuum outlet, such that a flow rate of the cleaning fluid and a vacuum pressure of the vacuum are equal in each of the plurality of holes.

According to one aspect of the disclosure, and potentially in combination with other disclosed aspects of the disclosure, the cleaning device further includes a vacuum manifold having a plurality of vacuum outlets; and a fluid manifold having a plurality of fluid inlets.

According to one aspect of the disclosure, and potentially in combination with other disclosed aspects of the disclosure, each of the plurality of nozzle assemblies is fluidly coupled to one of the plurality of fluid inlets, and each of the plurality of vacuum assemblies is coupled to one of the plurality of vacuum outlets, such that a flow rate of the cleaning fluid and a vacuum pressure of the vacuum vary in each of the plurality of holes.

According to one aspect of the disclosure, and potentially in combination with other disclosed aspects of the disclosure, a controller is configured to monitor and adjust the flow rate of the cleaning fluid and the vacuum pressure of the vacuum in each of the plurality of holes.

According to one aspect of the disclosure, and potentially in combination with other disclosed aspects of the disclosure, the nozzle includes a plurality of nozzle openings extending about a circumference of the nozzle.

According to one aspect of the disclosure, and potentially in combination with other disclosed aspects of the disclosure, a cleaning device for an optical table is disclosed, the cleaning device comprising: a top plate; a base plate; a plurality of vacuum assemblies, the plurality of vacuum assemblies include a vacuum outlet extending through at least a portion of the top plate; a plurality of nozzle assemblies, the plurality of nozzle assemblies being fluidly coupled to the plurality of vacuum assemblies and each including a nozzle configured to engage at least one hole of a plurality of holes formed in the optical table; and a gear assembly mechanically coupled to the plurality of nozzle assemblies, such that the gear assembly is configured to rotate the plurality of nozzle assemblies.

According to one aspect of the disclosure, and potentially in combination with other disclosed aspects of the disclosure, the plurality of nozzle assemblies are arranged in an array.

According to one aspect of the disclosure, and potentially in combination with other disclosed aspects of the disclosure, the plurality of nozzle assemblies dispense a cleaning fluid and the plurality of vacuum assemblies generate a vacuum in each of the plurality of holes simultaneously.

According to one aspect of the disclosure, and potentially in combination with other disclosed aspects of the disclosure, the cleaning fluid is compressed air.

According to one aspect of the disclosure, and potentially in combination with other disclosed aspects of the disclosure, the plurality of nozzle assemblies each include a swivel mechanism that engages the gear assembly.

According to one aspect of the disclosure, and potentially in combination with other disclosed aspects of the disclosure, a motor is electromechanically coupled to the gear assembly.

According to one aspect of the disclosure, and potentially in combination with other disclosed aspects of the disclosure, a method of cleaning at least one hole formed in an optical table is disclosed, the method comprising: aligning a cleaning device having a nozzle assembly and a vacuum assembly with the optical table, such that a nozzle of the nozzle assembly is aligned with the at least one hole; lowering the cleaning device onto the optical table such that the nozzle of the nozzle assembly is inserted within the at least one hole; activating the nozzle assembly such that a cleaning fluid is supplied to the at least one hole; and activating the vacuum assembly such that a vacuum is generated within the at least one hole; wherein the nozzle assembly and the vacuum assembly are activated simultaneously.

According to one aspect of the disclosure, and potentially in combination with other disclosed aspects of the disclosure, lowering the cleaning device onto the optical table further comprises engaging a plurality of alignment rods extending from the cleaning device with a plurality of positioning markers formed on the optical table.

According to one aspect of the disclosure, and potentially in combination with other disclosed aspects of the disclosure, activating the nozzle assembly further comprises rotating the nozzle of the nozzle assembly.

The terminology used herein is for the purpose of describing particular aspects only and is not intended to be limiting. As used herein, the singular forms “a,” “an,” and “the” are intended to include the plural forms, including “at least one,” unless the content clearly indicates otherwise. “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof. The term “or a combination thereof” means a combination including at least one of the foregoing elements.

It is noted that the terms “substantially” and “about” may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cleaning device for an optical table, the cleaning device comprising:
- a manifold defining a fluid passage and a vacuum passage;
- a nozzle assembly fluidly coupled to the fluid passage, the nozzle assembly including a nozzle configured to engage at least one hole formed in the optical table;
- a vacuum assembly fluidly coupled to the vacuum passage via a vacuum outlet, the vacuum outlet being configured to generate a vacuum within the at least one hole formed in the optical table;
- a fluid inlet fluidly coupled to the fluid passage, the fluid inlet being configured to provide a cleaning fluid to the nozzle of the nozzle assembly; and
- a plurality of alignment rods extending from a manifold distal end of the manifold, the plurality of alignment rods being engageable with a surface of the optical table;
- wherein the fluid inlet provides the cleaning fluid to the nozzle of the nozzle assembly and the vacuum outlet generates the vacuum within the at least one of hole formed in the optical table simultaneously.

2. The cleaning device of claim 1, wherein the cleaning fluid is isopropyl alcohol.

3. The cleaning device of claim 1, further comprising a base plate coupled to a manifold distal end of the manifold, such that the base plate contacts a top surface of the optical table when the nozzle of the nozzle assembly is engaged with the at least one hole formed in the optical table.

4. The cleaning device of claim 1, wherein the plurality of alignment rods engage a plurality of positioning markers formed on the optical table and align the nozzle of the nozzle assembly with the at least one hole.

5. The cleaning device of claim 4, wherein each of the plurality of alignment rods include a spring mechanism that compresses when each of the plurality of alignment rods contact the plurality of positioning markers formed on the optical table.

6. The cleaning device of claim 1, wherein the nozzle assembly includes a plurality of nozzle assemblies, the vacuum assembly includes a plurality of vacuum assemblies, and the at least one hole includes a plurality of holes.

7. The cleaning device of claim 6, wherein the plurality of nozzle assemblies are fluidly coupled to the fluid inlet and the plurality of vacuum assemblies are fluidly coupled to the vacuum outlet, such that a flow rate of the cleaning fluid and a vacuum pressure of the vacuum are equal in each of the plurality of holes.

8. The cleaning device of claim 6, further comprising:
- a vacuum manifold having a plurality of vacuum outlets; and
- a fluid manifold having a plurality of fluid inlets.

9. The cleaning device of claim 8, wherein each of the plurality of nozzle assemblies is fluidly coupled to one of the plurality of fluid inlets, and each of the plurality of vacuum assemblies is coupled to one of the plurality of vacuum outlets, such that a flow rate of the cleaning fluid and a vacuum pressure of the vacuum vary in each of the plurality of holes.

10. The cleaning device of claim 9, further comprising a controller configured to monitor and adjust the flow rate of the cleaning fluid and the vacuum pressure of the vacuum in each of the plurality of holes.

11. The cleaning device of claim 1, wherein the nozzle includes a plurality of nozzle openings extending about a circumference of the nozzle.

12. A cleaning device for an optical table, the cleaning device comprising:
- a manifold defining a fluid passage and a vacuum passage;
- a top plate;
- a base plate;
- a plurality of vacuum assemblies, the plurality of vacuum assemblies including a vacuum outlet extending through at least a portion of the top plate and coupled to the vacuum passage of the manifold;
- a plurality of nozzle assemblies fluidly coupled to the fluid passage of the manifold and to the plurality of vacuum assemblies and each of the plurality of nozzle assemblies including a nozzle configured to engage at least one hole of a plurality of holes formed in the optical table; and
- a gear assembly mechanically coupled to the plurality of nozzle assemblies, such that the gear assembly is configured to rotate the plurality of nozzle assemblies.

13. The cleaning device of claim 12, wherein the plurality of nozzle assemblies are arranged in an array.

14. The cleaning device of claim 12, wherein the plurality of nozzle assemblies dispense a cleaning fluid and the plurality of vacuum assemblies generate a vacuum in each of the plurality of holes simultaneously.

15. The cleaning device of claim 14, wherein the cleaning fluid is compressed air.

16. The cleaning device of claim 12, wherein the plurality of nozzle assemblies each include a swivel mechanism that engages the gear assembly.

17. The cleaning device of claim 12, further comprising a motor electromechanically coupled to the gear assembly.

18. A method of cleaning at least one hole formed in an optical table, the method comprising:
- aligning a cleaning device having a nozzle assembly and a vacuum assembly with the optical table, such that a nozzle of the nozzle assembly is aligned with the at least one hole;
- lowering the cleaning device onto the optical table such that the nozzle of the nozzle assembly is inserted within the at least one hole;
- activating the nozzle assembly such that a cleaning fluid is supplied to the at least one hole; and
- activating the vacuum assembly such that a vacuum is generated within the at least one hole;
- wherein the nozzle assembly and the vacuum assembly are activated simultaneously.

19. The method of claim 18, wherein lowering the cleaning device onto the optical table further comprises engaging a plurality of alignment rods extending from the cleaning device with a plurality of positioning markers formed on the optical table.

20. The method of claim 18, wherein activating the nozzle assembly further comprises rotating the nozzle of the nozzle assembly.

* * * * *